United States Patent [19]

Buslik

[11] 3,710,357

[45] Jan. 9, 1973

[54] MAGNETIC DISK STORAGE FILE IN SEALED ENCLOSURE

[75] Inventor: Walter S. Buslik, San Jose, Calif.

[73] Assignee: International Business Machines Corporation, Armonk, N.Y.

[22] Filed: July 2, 1970

[21] Appl. No.: 51,867

[52] U.S. Cl. ..................340/174.1 C, 178/6.6 DD, 179/100.2 CA

[51] Int. Cl. ..........................G11b 5/48, G11b 21/08

[58] Field of Search......178/6.6 DD; 179/100.2 P, 100.2 CA; 340/174.1 C, 174.1 E

[56] References Cited

UNITED STATES PATENTS

| | | | |
|---|---|---|---|
| 3,509,274 | 4/1970 | Kihara | 178/6.6 DD |
| 3,381,285 | 4/1968 | Wallen | 340/174.1 E |
| 3,303,485 | 2/1967 | Lee | 340/174.1 E |
| 3,110,889 | 11/1963 | Morley et al. | 340/174.1 E |
| 3,153,241 | 10/1964 | Ramrath et al. | 340/174.1 C |
| 3,566,381 | 2/1971 | Buslik et al. | 340/174.1 C |

*Primary Examiner*—J. Russell Goudeau
*Attorney*—Hanifin and Jancin and Nathan N. Kallman

[57] ABSTRACT

A sealed enclosure, such as used for magnetic disk packs contains an operative disk storage file, including the magnetic heads, head carriage and actuator, and a drive shaft, as well as a magnetic recording disk. An external power source or motor is coupled to the drive shaft for rotating the disk, and for providing power for accessing the heads to circumferentially defined data tracks. A cylindrical fin structure generates an air flow for cooling, and an air filter minimizes contamination.

11 Claims, 4 Drawing Figures

INVENTOR.
WALTER S. BUSLIK

BY Nathan N. Kallman
ATTORNEY

MAGNETIC DISK STORAGE FILE IN SEALED ENCLOSURE

CROSS-REFERENCE TO RELATED APPLICATION

In U.S. Pat. No. 3,566,381, issued Feb. 23, 1971, entitled "Actuator and Positioning Device", a disk storage system is disclosed, utilizing a fixed magnetic disk and an interchangeable magnetic disk container, mounted to the same drive spindle and accessed simultaneously by magnetic head assemblies mounted to a carriage that is external to the disk container.

BACKGROUND OF THE INVENTION

1. Field of the Invention

This invention relates to a novel portable disk file configuration, and in particular to a compact disk storage file contained in a sealed enclosure.

2. Description of the Prior Art

Magnetic disk files are widely used for storage of high density data, in conjunction with data processing systems. Presently known storage files employ disk packs having a multiplicity of record disks which are accessed by magnetic heads mounted to a carriage, the heads and carriage being disposed externally to the file. The head carriage is driven by an actuator, such as a hydraulic device, a lead screw, or linear D.C. motor, by way of example. The disks are contained within a disk pack enclosure, which is removable and interchangeable, whereas the head assemblies, head carriage and actuator form part of a stationary file apparatus, and are located externally to the enclosure.

In these prior art disk files, the head assemblies access the enclosed disk pack, generally in a radial direction through an aperture in the side of the enclosure. The radial spacing between the head assemblies and the surfaces of the record disks requires relatively long head assembly arms to reach the disk area and to traverse the large number of data tracks on the disk. Furthermore, very accurate guides are needed for movement of the head carriage, which supports the head assemblies, to and from the disks, resulting in an unduly large mass for the mechanical system associated with the accessing head assemblies. In addition, temperature variations affect the mechanical parts so that the accuracy of the radially accessing magnetic heads is degraded.

SUMMARY OF THE INVENTION

An object of this invention is to provide a novel, self-contained, compact, portable disk file.

Another object of this invention is to provide a disk file in a sealed container incorporating the magnetic head assembly and a head carriage of reduced mass, thereby requiring less power for fast access of data recorded on magnetic disks.

Another object is to provide an improved disk file affording very high track density without the need of track-following devices.

A further object is to provide a disk file configuration in which the operative elements are closely disposed and have low coefficients of thermal expansion, so that heat and temperature changes do not affect the operation of the file adversely.

According to this invention, a portable sealed container contains substantially all the operating elements of a disk storage file within its enclosure. In one embodiment of this invention, the sealed container encompasses a magnetic disk means and a movable magnetic head assembly, both powered by a single external drive motor. The head assembly is transported by a transport means disposed within the cartridge, and bidirectionally, relative to the record surface of the disk means for track-to-track accessing. The head assembly a transport means are positioned close to the disk means, and the path of travel is confined within the cylinder defined by the outer diameter of the disk means and the axis of rotation. By virtue of this compact configuration, the total mass of the disk file assembly and its movable elements are substantially reduced, and maintained in a close environmental relationship; and deleterious effects of temperature change and contamination are avoided.

BRIEF DESCRIPTION OF THE DRAWING

The invention will be described in greater detail with reference to the drawing, in which.

FIGS. *2a* and *2b* depict a portion of the actuator and positioning mechanism, which provides selective bidirectional drive to the magnetic head relative to the rotating disk means.

Similar numerals refer to similar elements throughout the drawing.

DESCRIPTION OF THE PREFERRED EMBODIMENT

Figure 1:
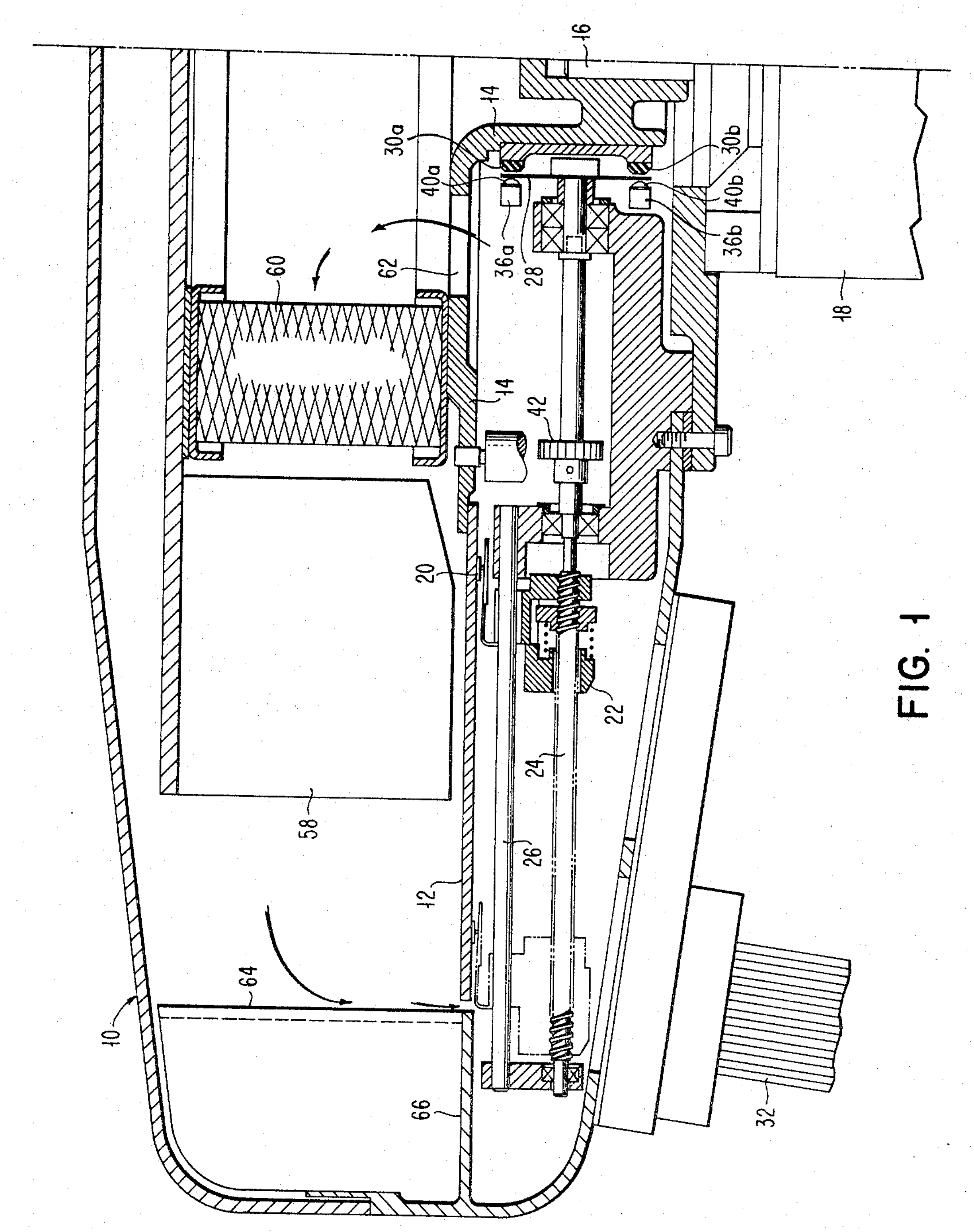
FIG. 1 is an elevational view, in partial section, of a disk file in a container, in accordance with this invention.

With reference to FIG. 1, a magnetic disk storage file is disposed within a sealed container 10, which may be made of a rigid plastic by way of example. The storage file includes a magnetic disk 12 joined, by adhesive for example, to a rotatable hub 14, that is mounted to a drive spindle 16. The spindle is driven by a synchronous motor 18, which is located externally adjacent to the file cartridge 10. The spindle 16 and motor 18 may be directly connected, or coupled by a pulley belt in a well known manner.

To achieve recording and readout of data on the disk surface, a magnetic head assembly 20 is mounted to a carriage 22, which is used to transport the head from track to track, along the surface of the magnetic disk 10. The head carriage is mounted to a lead screw or threaded shaft 24, along which the carriage 22 is transported when the lead screw is rotated. The carriage is also guided by a steady rail 26 that is fixed substantially parallel to the shaft 24 and which prevents the carriage from rotating about the lead screw 24. The head or transducer 20 is so positioned that its nonmagnetic gap is in close transducing relation with the surface of the disk 12. The head 20 may be a contact type, or alternatively the air bearing, flying head type.

The actuation and positioning of the transducer or head assembly 20 is accomplished in a manner similar to that set forth in the aforementioned U.S. Pat. No. 3,566,381, and as described hereinafter. In order to rotate the shaft 24, the power provided by the drive motor 18 is translated to a rotary flexible disk 28 seated at one end of the lead screw 24. A pair of wheels or tires 30*a*, are connected to the hub 14 and the drive spindle 16, which is positioned closely adjacent to one end of the lead screw 24, with the axis of the spindle 16 substantially perpendicular to the longitudinal axis of the lead screw. The tires 30*a* and *b* are spaced at a distance less than the diameter of the flexible drive disk 28, and are positioned so that the tires are closely adjacent to the peripheral area of the flexible drive disk.

Figure 2:
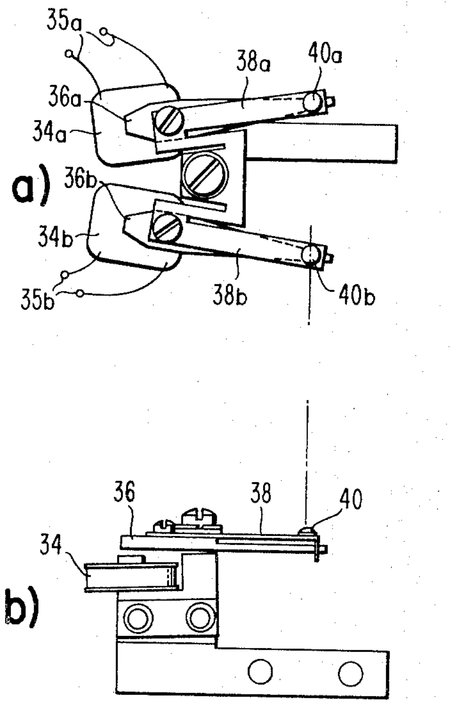

In operation, when a command is provided from a computer, processor, control unit, or the like, via an electrical connector 32, the actuator and positioning apparatus for the head assemblies are activated accordingly. When the head assembly 20 is to be moved to a desired track, the flexible disk 28 is selectively engaged with one of the tires 30 by energizing one of two associated electromagnets 34*a* or 34*b* through leads 35a or 35b (see FIG. 2), in accordance with the desired direction of travel for the magnetic head assembly.

When the selected electromagnet 34*a* or 34*b* is energized, an associated armature 36*a* or 36*b* is activated, and causes a preloaded leaf spring 38*a* or 38*b* to pivot towards the flexible disk 28. Each leaf spring 38 carries a pressure pad 40*a*, *b*, one of which urges the flexible disk 28 into contact with a tire 30*a* or 30*b* that is rotating with the drive spindle 16. As the tire 30 rotates, rotary motion is imparted to the contacting flexible drive disk 28 and thus, drives the lead screw 24. As a result, the head carriage 22 and the attached head assembly 20 are moved along the lead screw 24 in a linear direction prescribed by the rotary direction of the flexible disk 28. The linear velocity of the carriage 22 is dependent upon the speed of the drive motor 18 and the pitch of the threaded portion of the lead screw 24, among other things.

When the head assembly 20 arrives at the desired track position, rotation of the lead screw 24 and travel of the carriage 22 are halted substantially instantaneously. To achieve this rapid stop, a signal derived from the processor or control unit deenergizes the previously selected electromagnet 34, so that the pressure pad 40 is retracted by the preloaded leaf spring 38 from contact with the flexible drive disk 28, which in turn becomes disengaged from the associated tire 30.

Figure 3:
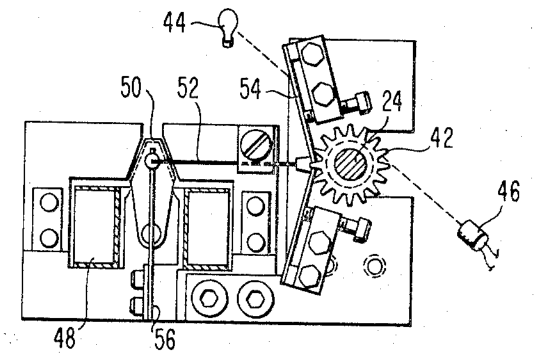
FIG. 3 is a schematic plan view of a detent mechanism that may be employed in the novel disk file of this invention.

In order to brake the lead screw 24 to a complete stop, a detenting means, such as illustrated in FIG. 3, is used. A toothed gear 42, which is mounted to the lead screw shaft 24 is sued to sense the angular displacement of the lead shaft, and to count the number of data tracks traversed by the head assembly 20. The counting action is accomplished by utilizing a radiation or light source 44 that is directed past the spaces between teeth of the gear 42, and impinges on a photocell 46. The alternate interruptions and passage of light through the notched gear provides an electrical signal output from the photocell representing the angular stepping of the gear 42 and thus that of the lead screw 24. When the desired number of data tracks have been crossed so that the head assembly 20 is seated adjacent to the desired data track on the disk surface, a solenoid 48 is energized thus activating an armature 50. The armature 50 acts on a push rod or wire 52 that causes pivoting of detent pawls 54 to engage the teeth of the gear 42. When the solenoid 48 is deenergized, a return spring 56 acts to retract the pivotable pawls 54, thereby releasing the gear 42 for rotation.

To achieve circulation of air in the sealed disk file container, a fin structure 58 is provided in conjunction with an air filter 60 that reduces contamination. The air filter is connected to the drive hub 14 and, in turn, the fin 58 is joined to the air filter 60 for rotation therewith. The air circulates through apertures 62 in the disk file hub 14, through the air filter 60, and to an air scoop 64 that deflects the circulating air through a opening in the annular baffle 66 between the magnetic disk 12 and the container wall. The circulating, filtered air enters the disk and magnetic head area, and is returned through the apertures 62 in the rotary file hub 14, thus completing a circulating air loop. In this way, undesirable heating is reduced, and contamination problems are minimized.

Another feature of this invention is the use of materials having low coefficients of thermal expansion, and also having thermal coefficients that are the same or within a narrow range. As a result, any changes in temperature caused by heating, or the like, will affect the dimensions of the parts to a similar degree. Preferably, the disk, the drive hub, and the lead screw are formed from the same material, which may be a ceramic such as Invar (trademark of INTERNATIONAL NICKEL CORP.) or Nilvar (trademark of DRIVER-HARRIS CO.). Therefore, radial and linear variations of the closely spaced magnetic disk, hub and lead screw are simultaneous and similar. Consequently, the carriage and head assembly maintains the same relation and registration with reference to the radially spaced concentric data tracks.

Also, since the same magnetic head reads the data that it has written, skew and runout tolerances are reduced and data readability is improved. Fixed heads may be used, if desired, since the heads and disks need not be interchangeable. Additionally, more than one head per surface may be employed, thereby reducing head travel and thus access time.

The geometry of the disk file in a container affords a carriage of low mass and a savings in space. The carriage may have a mass of only a few grams, for example 5 to 10 grams, by virtue of eliminating the long head arm assemblies that are conventionally used in present day accessing disk files. Also, the requirements for accurate carriage guidance is eliminated The low mass carriage and head assembly makes it possible to achieve fast access time with a relatively minor expenditure of energy.

Furthermore, because changes in temperature are compensated by the arrangement and materials of the lead screw, the magnetic disk and the drive hub, head to data track registration is maintained to a high degree of accuracy, thus making it possible to obtain very high track densities without the need of track following systems. In addition, the main power source and the major heat-generating elements are outside the file enclosure, thereby avoiding the effects of temperature variations that are usually produced inside a disk file. The novel configuration disclosed herein lends itself to both mechanical as well as magnetic detenting, and to contact as well as flying head or air bearing recording. With this configuration, in-contact recording is preferred because of its simplicity and the advantages obtained in head and suspension design.

It should be understood that the scope of the invention is not limited to the particular configuration set forth above. Various modifications and changes may be made in the materials, dimensions and arrangements of the different parts of the disk file in a sealed container, within the spirit of this invention.

What is claimed is:

1. A magnetic disk file comprising:
a sealed container containing a rotary drive hub;
magnetic disk means mounted to said hub;
a magnetic head assembly disposed in close transducing relation with said disk means; and
means for transporting said magnetic head assembly and bidirectionally to access selected discrete concentric data tracks on a surface of said disk means,
said head assembly and said transporting means being permanently positioned within said container, between the walls of the container enclosure and the axis of rotation of said disk means and positioned adjacent to the same surface of said disk means.

2. A magnetic disk file as in claim 1, wherein said transporting means comprises a head carriage, and a lead screw to which said carriage is mounted for bidirectional travel.

3. A magnetic disk file as in claim 2, wherein a single drive motor powers said rotary drive hub and said lead screw.

4. A magnetic disk file as in claim 2, including selective actuator means coupled to said lead screw for determining the direction and extent of travel of said carriage in response to control signals.

5. A magnetic disk file as in claim 4, including coupling means for electrical connection to an external control or processing unit for receiving control and data signals.

6. A magnetic disk file as in claim 2, including a guide rail positioned substantially parallel to said lead screw for supporting said magnetic head assembly and for bidirectional radial linear movement relative to said disk means.

7. A magnetic disk file as in claim 2, wherein at least said lead screw and said disk means are formed from material having a substantially similar coefficient of thermal expansion.

8. A magnetic disk file as in claim 2, wherein said lead screw and said disk means are formed from material having a relatively low coefficient of thermal expansion.

9. A magnetic disk file as in claim 1, including means for circulating the air within said container in a defined path.

10. A magnetic disk file as in claim 9, wherein said air circulating means comprises a fin that rotates with said rotary drive hub.

11. A magnetic disk file as in claim 9, including a filter for cleaning the air that is circulated.

* * * * *